April 12, 1960
G. W. ROPER
2,932,362
DUST COLLECTOR AND ELEMENT FOR USE IN SAME
Filed Aug. 30, 1957
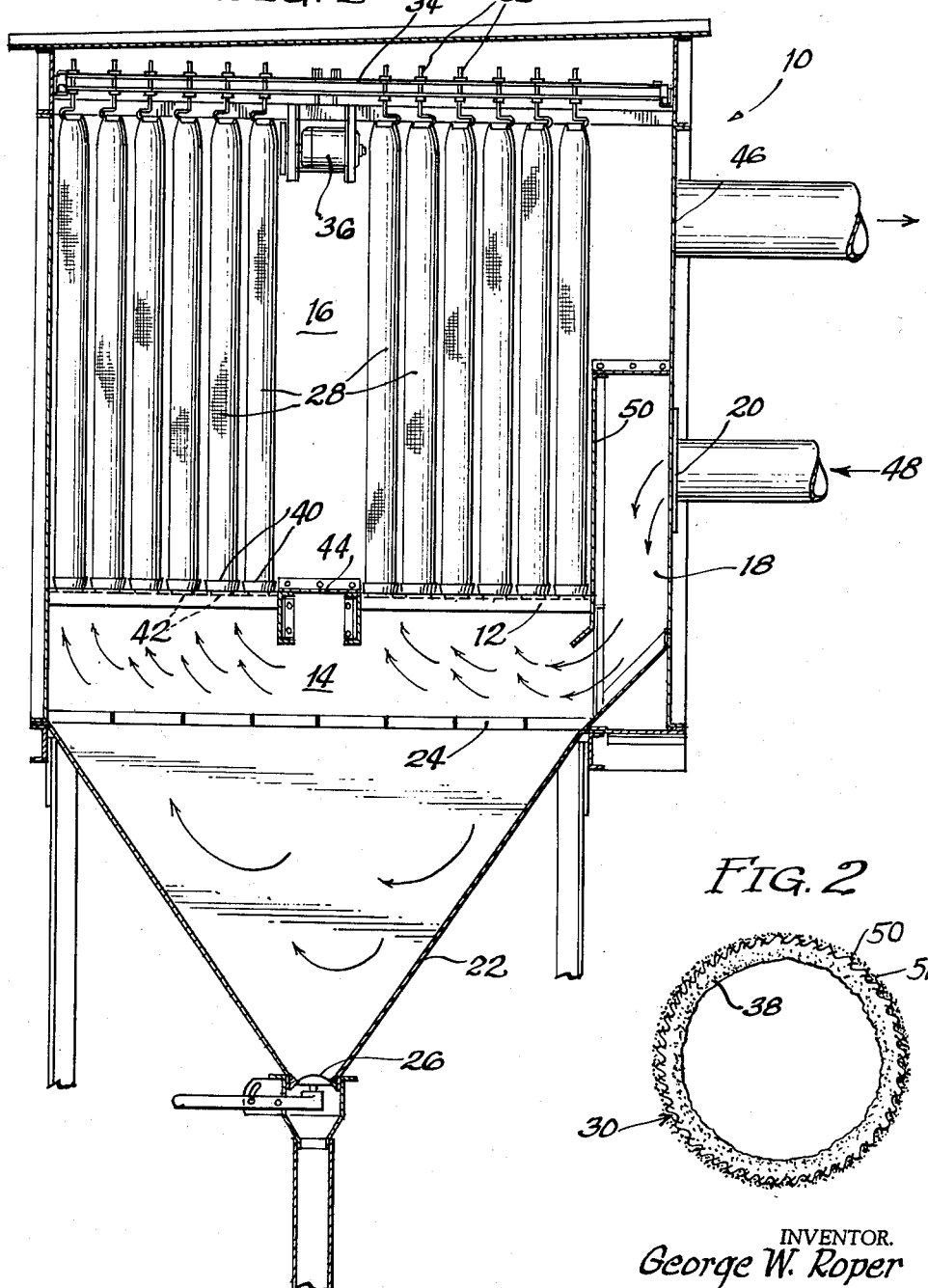
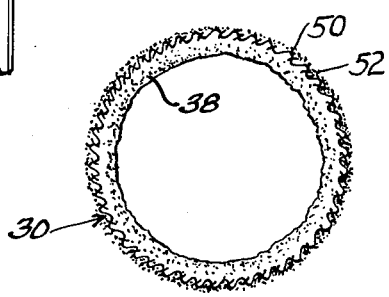
INVENTOR.
George W. Roper
BY
Ooms, McDougall, Williams & Hersh
Attorneys United States Patent Office 2,932,362
Patented Apr. 12, 1960

2,932,362

DUST COLLECTOR AND ELEMENT FOR USE IN SAME

George William Roper, South Bend, Ind., assignor to Wheelabrator Corporation, Mishawaka, Ind., a corporation of Nebraska Application August 30, 1957, Serial No. 681,264

3 Claims. (Cl. 183—51)

This invention relates to a device for the removal of dust, dirt and other foreign particles from air or other gaseous medium, and it relates more particularly to an improved filter fabric for use in a filter device of the type described.

Filter devices of the type described, hereafter referred to as "dust collectors," make use of a filter fabric or cloth through which dust or dirt laden air or gas is caused to flow to filter out the dust or dirt particles on the ingoing side of the fabric while the cleaned air or gaseous medium continues to flow through the interstices of the fabric for exhaust into the atmosphere or for other use. Commercial reduction to practice is represented by dry dust collectors of the type manufactured by Wheelabrator Corporation under the trademark "Dustube," and its filter, described in the Snyder Patent No. 2,143,664. Briefly described, a plurality of dust tubes formed of filter cloth are suspended vertically from shaker rods within a filter housing. The upper ends of the tubes are closed while the lower ends at the bottom communicate with an inlet plenum chamber through which dust laden air is introduced for passage into the tubes and through the fabric to filter out the dust or dirt particles on the inner surfaces thereof while the cleaned air passes through the tube into the housing for exhausting into the atmosphere. Periodically, the flow of air into the tubes is stopped so that the filter tubes can be shaken to loosen the dust or dirt which falls downwardly through the inlet plenum chamber into a collector.

For most efficient use, it is desirable to secure effective removal of dust or dirt from the air with the greatest amount of throughput possible and with a maximum amount of time between shakedowns. To achieve this end, filtration should be carried out with minimum pressure drop across the filter surface notwithstanding the amount of air or gases filtered through and the amount of thickness of the filter cake built up of the particulate substances collected on the walls of the filter cloth.

It is an object of this invention to produce a dust collector of the type described which provides for minimum pressure drop across the filter surface in use and thereby increases the efficiency and output of the unit.

Another object is to produce a filter element for use in a device of the type described which is effective for the removal of dirt or dust particles from air or other gaseous medium but which provides for less pressure drop across the filter by comparison with filter elements heretofore employed.

A further object is to produce an improved dust collector through which greater amounts of air or other gaseous medium can be processed and in which larger amounts of particulate substance can be removed without increased power consumption and without the necessity for more frequent shakedown for the displacement of the particulate substance from the filter surface.

These and other objects and advantages of this invention will hereinafter appear, and for purposes of illustration, but not of limitation, an embodiment of the invention is shown in the accompanying drawing in which:

Fig. 1 is a schematic elevational view, in section, of a filter device which may be employed in the practice of this invention, and Fig. 2 is a sectional view through a filter tube embodying the practice of this invention.

Referring now to the drawing, the numeral 10 indicates a housing having a bottom wall 12 in the form of a cell plate which separates the housing into an equalizing chamber 14 and a bag house 16. The equalizing chamber 14 communicates with an inlet plenum chamber 18 having an inlet opening 20 through which dirt or dust laden air or gaseous medium is introduced into the system. Immediately below the equalizing chamber there is provided a hopper 22 separated from the equalizing chamber by an open grating 24. A passage having a removable door 26 is provided at the bottom of the hopper for the removal of dust or dirt collected therein.

In the bag house 16 there is provided a plurality of elongate filter tubes 28 formed of a pervious filter cloth 30. The upper ends of the tubes are closed and are suspended from vertically adjustable hanger rods 32 which are, in turn, connected to shaker bars 34 which extend horizontally crosswise of the housing. Means, such as an eccentric operating motor 36 is operatively connected to the bars 34 to impart a rocking movement which causes the bags to be whipped back and forth to loosen particulate substances filtered from the air and collected as a filter cake 38 on the inner surfaces of the filter tubes. The lower ends of the tubes are fitted with rings or collars 40 which secure the open ends of the tubes in communication with openings 42 extending through the cell plate 12.

The filter tubes 28 in the bag house may be divided into separated compartments as illustrated in Fig. 1 of the drawing with a walkway 44 in between to enable access for inspection of the tubes. In a modification of the type described, one group of tubes can be on stream for filtration while the other group is being prepared for use, thereby to maintain substantially continuous operation. The bag house 16 is provided with an outlet opening 46 for releasing the filtered air or gas for disposal into the atmosphere, or for other use.

In operation, dirt or dust laden air 48 is introduced under pressure into the housing through the inlet opening 20 into the inlet plenum chamber. A baffle plate 50 in the inlet plenum chamber operates in combination with the change of direction of the air flow to throw out some of the heavier particles of dirt from the air stream. As the air enters the equalizing chamber 14 and is expanded, further amounts of dirt of larger dimension or higher specific gravity separate from the air stream for passage downwardly into the collector. As indicated by the arrows showing the direction of flow, the dust laden air passes downwardly from the inlet plenum chamber through the equalizing chamber and into portions of the hopper where the air again changes direction to assist further in the separation of dirt particles. Such separated particles remain in the hopper while the air laden with finer particles of dirt and dust continues to travel upwardly through the equalizing chamber and through the openings in the cell plate into the filter tubes in communication therewith. The finer particles of dirt and dust remaining in the air are filtered out on the inner surfaces of the filter cloth as the air flows through the tubes into the bag house and out through the outlet opening 46.

After a period of such operation, the amount of dust or dirt built up as a filter cake 30 on the walls of the tubes 28 raises the pressure drop across the filter so that more power is required for operation and a lesser amount of air is capable of being processed. When this occurs, the circulation is shut off and the shaker mechanism is operated. This causes oscillation of the shaker bars 34 to impart a snapping or whipping action to the upper ends of the filter bags to loosen the particulate material which has been collected on the inner surfaces thereof. The separated material falls gravitationally downwardly through the openings of the cell plate and through the equalizing chamber into the hopper 22 from which it can be removed. After a brief interval of shaking, the circulation of dirt and dust laden air is continued to effect the described cleaning operation.

It has been found that in the filtration of dust and dirt from air or other gaseous medium, the rise in pressure across the filter surface builds up more rapidly with some dust and dirt by comparison with others. Such rises in pressure are indicative of degrees of permeability of the filter cake and it results in the utilization of increased power for filtration in lesser volumes of gas or air that can be treated before shutdown is required to remove the filter cake built up on the walls of the tubes.

It has been found, in accordance with the practice of this invention, that the pressure drop across the filter surface can be decreased and the permeability of the filter cake 38 can be markedly increased when the filter fabric 50 of which the tubes are formed is treated with a graphite 52, preferably of the electrically conductive types.

The amount of improvement secured when the graphite is applied as a coating on the ingoing side of the fabric is less than the improvement achieved when the graphite is embodied as an impregnant in the fabric. Best results are secured when the graphite is present on the outer surfaces of the filter fabric. While it is preferred to have the graphite uniformly distributed for complete coverage of the surface of the filter fabric in a concentration incapable of forming a barrier or interfering with the flow or filtered air, improvement in operation will be secured when the graphite is present in a non-uniform distribution or even when present in spaced sections of the fabric. The improved results can be secured when the filter tubes are treated subsequent to their fabrication or when the fabric of which the tubes are formed is treated with graphite in advance of the fabrication of the tubes. The graphite can be applied from aqueous or solvent medium as by means of a spray process or by brush coating or by other conventional coatings or treating means.

It is only necessary to make use of a small amount of graphite, preferably of colloidal dimension (less than 5 microns). The described improvements are noticeable when the graphite is present on the filter fabric in an amount corresponding to about .000001 pound of graphite per square foot of filter fabric. Best results are secured when the graphite is present in an amount within the range of .00005 to .0005 pound per square foot of filter fabric. It is undesirable to make use of an amount of graphite in excess of .001 pound per square foot of filter fabric. As the filter fabric it is preferred to make use of a woven fabric although other fabrics can be used.

The mechanism by which the graphite operates to decrease the pressure drop across the filter surface and to increase the permeability of the filter cake is not, for the present, understood. While the improvement in filtration efficiency is not noticeable with dirt and dusts capable of acquiring an electrostatic charge, it is believed that the mechanism differs, at least in part, from that of a grounding medium to bleed off static because the results secured differ by comparison with that which is achieved by grounding the filter tubes with copper bands, wires or the like, or by use of other conventional means for reducing the build-up of static charge on the fibers of the filter fabric. The use of graphite is effected to improve the permeability and pressure drop characteristics substantially independently of the fibrous component of which the filter cloth is formed including fabrics woven of synthetic resinous fibers such as polyesters (Dacron and Orlon), or polyamides (nylon), polytetrafluoroethylene (Teflon), or polyvinylidene chloride (Saran) or any organic siliceous material, such as glass fibers or natural fibers such as cotton, wool, silk, hemp and the like, although improvement is most pronounced when the graphite is used in combination with the synthetic resinous or siliceous fibers as compared with natural fibers.

The improvement which is secured in permeability of the filter cake and in reduction of pressure drop across the filter surface can best be illustrated by comparisons made with a commercial machine employed in commercial operation, as will hereinafter be described.

Four dust tubes of polyester (Orlon) fibers were spray coated with a 2 percent dispersion of graphite (Acheson Colloid No. 154) in methanol. The composition was applied in the amount of about one-fifth gallon per bag. The graphite coated bags were placed in one corner section of the bag house and measurements were taken of the corner bag which was surrounded by the other three of the treated bags. Four bags formed of the same material, but uncoated, were similarly placed in another similar corner of the bag house. The dust collector was placed on stream for a period of time and the amount of dust collected in the coated and uncoated bags was determined. The bags were emptied as fully as possible and used again in a second cycle of operation.

The amount of dust removed after the first cycle from the coated bag was 4.5 ounces while the amount of dust removed from the uncoated bag was 1.5 ounces. The amount of dust removed during the second cycle was 4.0 ounces for the coated bag and 1.5 ounces for the uncoated bag. From the foregoing, it will be apparent that the bags coated with graphite collected about three times as much dust or dirt as the uncoated bags under the same conditions of use.

Obviously, to collect three times as much dirt and dust in the coated bags as compared to the uncoated bags, the air velocity or the amount of air circulated through the coated tubes must have been proportionately greater than the amount of air circulated through the uncoated tubes. This is indicative of the greater permeability of the filter cake and the lesser pressure drop across the filter surface of the coated bags since the air pressure conditions existing in the equalizing chamber feeding all of the tubes were equivalent so that equal volumes of air with equal amounts of dust would ordinarily have passed through each of the tubes if the permeability of the filter cakes were the same.

Instead of graphite, use can be made of petroleum cakes and carbon blocks but not without sacrifice of some efficiency.

While not equivalent from the standpoint of composition or results, improvement in filtration efficiency is capable of being secured when the filter fabric is treated with other materials, as represented by finely divided particles of copper, copper oxides, molybdenite, aluminum metal, metallic iron, and iron oxides.

It will be understood that the concepts described in the use of graphite for treatment of filter surfaces are applicable to other filter media employed for dry separation of dust and dirt particles from air or other gaseous medium. The amount of graphite applied to the surface is not critical with the exception that such amounts should not be applied as a coating onto the filter fabric as would deleteriously affect the permeability of the fabric or its utilization as a filter medium. The correct amount of graphite may be easily determined for use.

It will be further understood that changes may be made in the details of construction of the filter media and in the application of the graphite without departing from the spirit of the invention, especially as defined in the following claims.

I claim:

1. In a dust collector, a filter element adapted to be arranged across the path of a gas to be filtered so that gas enters the filter on one side and passes out of the filter on the opposite side, said element being formed of a fibrous fabric and finely divided, electrically conductive graphite particles present in an amount within the range of about 0.0005 to 0.005 pound per square foot of surface area on the outgoing side of the filter fabric.

2. In a dust collector, a filter tube formed of a filter fabric of synthetic fibers and finely divided electrically conductive particles of graphite present in uniform distribution in the fabric in an amount greater than 0.00001 but less than 0.005 pound per square foot of surface area.

3. In a dust collector, a filter tube adapted to be arranged across the path of a gas to be filtered so that gas enters the filter tube on one side and passes out of the filter tube on the opposite side, said filter tube being formed of a filter fabric of synthetic fibers and finely divided electrically conductive particles of graphite present in an amount greater than 0.000001 but less than 0.005 pound per square foot of surface area on the outgoing side of the fabric and partially impregnating the fabric.

References Cited in the file of this patent

UNITED STATES PATENTS

| | | |
|---|---|---|
| 1,798,164 | Kuhn et al. | Mar. 31, 1931 |
| 1,814,190 | Sebastian et al. | July 14, 1931 |
| 1,818,155 | Oglesby et al. | Aug. 11, 1931 |
| 1,829,068 | Smith | Oct. 27, 1931 |